(12) United States Patent
Lee et al.

(10) Patent No.: US 9,052,962 B2
(45) Date of Patent: Jun. 9, 2015

(54) DISTRIBUTED STORAGE OF DATA IN A CLOUD STORAGE SYSTEM

(75) Inventors: Eo-Hyung Lee, Gyeonggi-do (KR);
Mi-Jeom Kim, Gyeonggi-do (KR);
Hyo-Min Kim, Seoul (KR); Chang-Sik Park, Seoul (KR); Jin-Kyung Hwang, Gyeonggi-do (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

(21) Appl. No.: 13/435,064

(22) Filed: Mar. 30, 2012

(65) Prior Publication Data
US 2012/0259901 A1    Oct. 11, 2012

(30) Foreign Application Priority Data
Mar. 31, 2011    (KR) .................. 10-2011-0029851

(51) Int. Cl.
G06F 7/00       (2006.01)
G06F 17/00      (2006.01)
G06F 9/50       (2006.01)
G06F 17/30      (2006.01)

(52) U.S. Cl.
CPC ........ *G06F 9/5072* (2013.01); *G06F 17/30283* (2013.01)

(58) Field of Classification Search
None
See application file for complete search history.

(56) References Cited

U.S. PATENT DOCUMENTS

| | | | |
|---|---|---|---|
| 5,315,601 A | 5/1994 | Lee et al. | |
| 7,650,328 B2 | 1/2010 | Hori et al. | |
| 7,739,233 B1 | 6/2010 | Ghemawat et al. | |
| 7,823,009 B1 | 10/2010 | Tormasov et al. | |
| 7,853,770 B2 | 12/2010 | Tajima et al. | |
| 8,103,636 B2 | 1/2012 | Lee et al. | |
| 8,676,593 B2* | 3/2014 | Nagpal et al. | 705/1.1 |
| 8,943,023 B2* | 1/2015 | Sorenson, III | 707/637 |
| 2004/0064633 A1 | 4/2004 | Oota | |
| 2005/0125456 A1 | 6/2005 | Hara et al. | |
| 2005/0223018 A1* | 10/2005 | Forin et al. | 707/100 |
| 2005/0256923 A1 | 11/2005 | Adachi | |
| 2006/0047751 A1 | 3/2006 | Chen et al. | |
| 2006/0069828 A1 | 3/2006 | Goldsmith | |
| 2007/0300220 A1 | 12/2007 | Seliger et al. | |
| 2008/0021935 A1 | 1/2008 | Geelen et al. | |
| 2008/0059704 A1* | 3/2008 | Kavuri | 711/117 |
| 2008/0317068 A1 | 12/2008 | Sagar et al. | |
| 2009/0144579 A1 | 6/2009 | Swanson | |
| 2010/0058341 A1 | 3/2010 | Jung et al. | |
| 2010/0076933 A1 | 3/2010 | Hamilton et al. | |
| 2010/0161759 A1 | 6/2010 | Brand | |
| 2010/0250497 A1* | 9/2010 | Redlich et al. | 707/661 |
| 2010/0274762 A1 | 10/2010 | Murphy et al. | |
| 2010/0318609 A1 | 12/2010 | Lahiri et al. | |

(Continued)

FOREIGN PATENT DOCUMENTS

| | | | |
|---|---|---|---|
| JP | 2008-059438 A | | 3/2008 |
| KR | 10-1993-0007928 B1 | | 8/1993 |

(Continued)

*Primary Examiner* — Loan T Nguyen
(74) *Attorney, Agent, or Firm* — IP Legal Services, LLC

(57) ABSTRACT

Provided are apparatus and method for distributedly storing an object in a plurality of data centers included in a cloud storage system. In the method, an object may be divided into a plurality of sub-objects each having a fragmentation size. Then, the sub-objects may be distributedly stored in at least one data center based on weights of the plurality of data centers.

14 Claims, 5 Drawing Sheets

(56) References Cited

U.S. PATENT DOCUMENTS

| | | | |
|---|---|---|---|
| 2010/0325199 A1 | 12/2010 | Park et al. | |
| 2010/0333116 A1* | 12/2010 | Prahlad et al. | 719/328 |
| 2011/0202741 A1 | 8/2011 | Tajima et al. | |
| 2012/0166487 A1* | 6/2012 | Stougie et al. | 707/792 |
| 2012/0233522 A1* | 9/2012 | Barton et al. | 714/758 |
| 2013/0275381 A1* | 10/2013 | De Schrijvr et al. | 707/652 |
| 2013/0286579 A1* | 10/2013 | De Spiegeleer et al. | 361/679.33 |

FOREIGN PATENT DOCUMENTS

| | | |
|---|---|---|
| KR | 10-1993-0023826 A | 12/1993 |
| KR | 10-2001-0091593 A | 10/2001 |
| KR | 10-2004-0028594 A | 4/2004 |
| KR | 10-2005-0033615 A | 4/2005 |
| KR | 10-2007-0012544 A | 1/2007 |
| KR | 10-2007-0032734 A | 3/2007 |
| KR | 10-0719285 B1 | 5/2007 |
| KR | 10-2007-0067069 A | 6/2007 |
| KR | 10-2007-0108133 A | 11/2007 |
| KR | 10-2009-0036276 A | 4/2009 |
| KR | 10-2009-0062747 A | 6/2009 |
| KR | 10-0923394 B1 | 10/2009 |
| KR | 10-0931260 B1 | 12/2009 |
| KR | 10-2010-0025980 A | 3/2010 |
| KR | 10-2010-0055297 A | 5/2010 |
| KR | 10-2010-0060304 A | 6/2010 |
| KR | 10-2010-0060715 A | 6/2010 |
| KR | 10-2010-0069234 A | 6/2010 |
| KR | 10-2010-0073154 A | 7/2010 |
| KR | 10-2010-0092850 A | 8/2010 |
| KR | 10-0985169 B1 | 10/2010 |
| KR | 10-2010-0122197 A | 11/2010 |
| KR | 10-2010-0137323 A | 12/2010 |
| KR | 10-1023585 B1 | 3/2011 |

\* cited by examiner

Block-based cloud storage system

Object-based cloud storage system

DISTRIBUTED STORAGE OF DATA IN A CLOUD STORAGE SYSTEM

CROSS REFERENCE TO PRIOR APPLICATIONS

The present application claims priority under 35 U.S.C. §119 to Korean Patent Application No. 10-2011-0029851 (filed on Mar. 31, 2011), which is hereby incorporated by reference in its entirety.

FIELD OF THE INVENTION

The present invention relates to a cloud storage system and, in particular, to distributed data storage within data centers of the cloud storage system.

BACKGROUND OF THE INVENTION

Lately, cloud computing has been introduced allowing for computing as a service using resources distributed over a network. For example, cloud computing may provide computation, software applications, data access, data management, and storage resources without requiring users to know the location other details of the computing infrastructure. Such cloud computing can be defined as an on-demand outsourcing service provided through a communication network. In a cloud computing environment, a service provider may form cloud centers by virtually integrating resources distributed over a communication network and provide a cloud service to a user through the cloud centers. Such a cloud center may be a basic unit to provide a cloud service in cloud computing environment. In order to provide the cloud service to a client, the cloud center may create at least one virtual machine using associated resources, such as a computing node and a storage node.

The cloud service may include a storage service. The storage service may be referred to as cloud storage, data storage as a service, or storage as a service (SaaS). That is, the cloud storage service may denote a storage service provided through a network. The cloud storage service may be easily expandable and easily applicable to a commercial system. S3 of Amazon, Rackspace of Nirvanix, and Mosso cloud division of Hosting may be well-known examples of a cloud storage system.

A cloud storage system may be a virtual storage system that may integrate physical heterogeneous storage devices into one logical virtual storage pool using software program or hardware equipment for virtualization function. The cloud storage system may allocate storage resources to clients when necessary. The cloud storage system may have many advantages, such as high resource utilization, cost reduction, high expandability; and high availability. Such advantages may be achieved through virtualization of physical storage devices. For example, a cloud storage system may virtually allocate storage devices according to various demands. Accordingly, virtual allocation may prevent unnecessary storage devices from being added and increase utilization of existing storage devices. A cloud storage system may reallocate storage devices having low utilization or be not used for a predetermined time period among distributed storage devices through virtualizing the storage devices. Accordingly, reallocation may reduce costs for adding new storage devices into a cloud storage system. Furthermore, a cloud storage system may easily and conveniently add new storage devices through virtualization of storage devices without interrupting storage services. Moreover, a cloud storage system may mirror or duplicate the same data through virtualizing storage devices. Accordingly, the cloud storage system may prevent data loss even though a particular storage device malfunctions.

As described above, a cloud storage system may control and manage a plurality of storage devices as one storage pool. Each storage device in the storage pool may have different performance according to a storage capability. Accordingly, discriminately managing each storage device according to a storage capacity might be advantageous or even required.

A typical cloud storage system may control timing of storing data in storage devices. Particularly, the data storing times of each storage device may be decided in proportion to a storage capacity of each storage device. However, the typical cloud storage system does not distribute data to storage devices according to storage capacities of storage devices. Distributed storage of data may result in data that is split into a plurality of fragments having a certain size and the plurality of fragments are distributedly stored in different storage devices.

For example, a storage device A has a storage capacity of about 20 GB and a storage device B has a storage capacity of about 100 GB. The data storing time ratio of storage devices A and B may be discriminately defined as 1:5 according to the storage capacities of storage devices A and B. After 10 GB-data is stored in the storage device B five times, the data storing time of the storage device B reaches its maximum data storing time. In this case, the typical cloud storage system cannot store data in the storage device B anymore, even though the storage device B still has available space to store data.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a cloud storage system may distribute data to a plurality of data center based on storage resources of the data centers.

In accordance with another aspect of the present invention, a cloud storage system may divide an object into a plurality of sub-objects based on a fragmentation size and distributedly store the plurality of sub-objects in at data centers based on storage capacities of the data centers.

In accordance with an exemplary embodiment of the present invention, a method may be provided for distributedly storing data in a plurality of data centers in a cloud storage system. The method may include dividing an object into a plurality of sub-objects each having a fragmentation size, and distributedly storing the sub-objects in at least one data center based on weights of the plurality of data centers.

The method may include determining each fragmentation size based dividing an average object size by a sum of the weights of the plurality of data centers.

The method may include determining the weights based on storage resources of each of the plurality of data centers.

The storage resources may include storage capacities of the plurality of data centers.

For the distributedly storing, a corresponding weight of a data center may be based on a ratio of a storage capacity of the data center to storage capacities of other data centers. The distributedly storing the sub-object may include determining, a number of sub-objects to be stored in each data center based on a weight of each data center.

For the distributedly storing the sub-objects, more sub-objects may be stored in a data center having a higher weight than a data center having a lower weight.

The method may include storing and managing the weights of the data center in a form of metadata.

The method may include receiving the object from a client with a request of storing the object in the cloud storage system.

The method may further include calculating a first hash value of the object, and assigning the first hash value to the sub-objects as a correlation value.

The method may include storing and managing the hash value of the object and the correlation value of the sub-objects as metadata.

The method may include determining, with the hash value of the object and the correlation value of the sub-objects, whether the object is related to the sub-objects and whether the sub-objects are related to each other.

The method may further include calculating a second hash value of each sub-object based on a filename of each sub-objects, and determining at least one data center to store sub-objects based on the second hash value of a corresponding sub-object.

The method may include processing the second hash value of each sub-object into a reference number and indicating, based on the second hash value, at least one data center in metadata stored in a metadata database.

In accordance with another embodiment of the present invention, a method may be provided for retrieving an object in a cloud storage system including a plurality of data centers. The method may include receiving, from a client, a request of retrieving an object from the cloud storage system, determining data centers in the cloud storage system, which store sub-objects divided from the object, requesting the determined data centers to transmit the sub-objects, receiving the sub-objects from the determined data centers, restoring the object by combining the received sub-objects, and transmitting the restored object to the client.

The determining data centers may include determining whether a sub-object is divided from the object based on a correlation value of the sub-object and a hash value of the object.

The method may include determining sub-objects having a correlation value identical to a hash value of the object as the sub-objects divided from the object.

In accordance with another embodiment of the present invention, an apparatus may be provided for distributedly storing an object in a plurality of data centers included in a cloud storage system. The apparatus may include a divider and a distributor.

The divider may be configured to divide an object into a plurality of sub-objects each having a fragmentation size, and the distributor may be configured to distributedly store the plurality of sub-objects in at least one data center based on weights of the data centers. The fragmentation size may be determined based on a result of dividing an average object size by a sum of the weights of the data centers. A weight of a data center may be a ratio of a storage capacity of the data center to storage capacities of other data centers.

The apparatus may further include a correlation unit and a storage location decider. The correlation unit may be configured to calculate a first hash value of the object and assign the first hash value to the sub-objects as a correlation value. The storage location decider may be configured to calculate a second hash value of each sub-object based on a filename of each sub-object and to determine at least one data center to store the sub-objects based on the second hash value of each sub-object.

The storage location decider may be configured to i) obtain reference numbers that indicate the at least one data center in metadata stored in a metadata database by processing the second hash value of each sub-object and ii) determine data centers to store the sub-objects based on the reference numbers. The distributor may be configured to determine a number of sub-Objects to be stored in the determined data centers based on weights of the determined data centers. Furthermore, the distributor may be configured to store more sub-objects in a data center having a higher weight than a data center having a lower weight.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
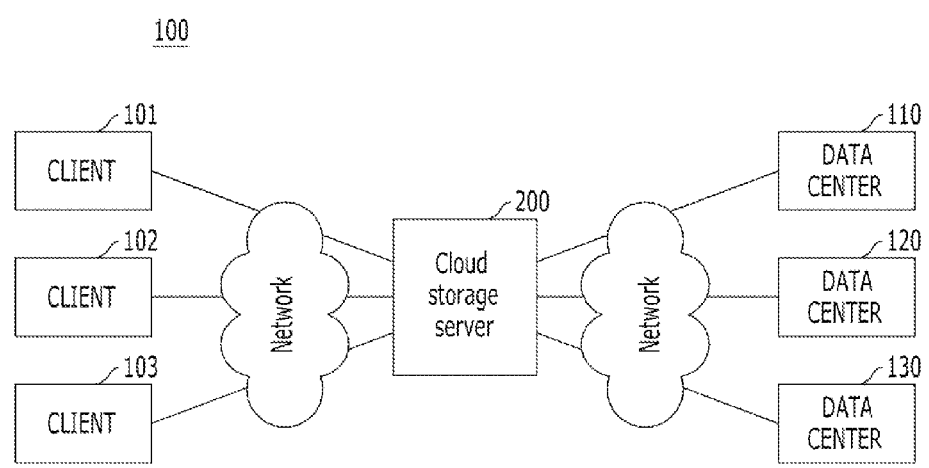
FIG. 1 shows a cloud storage system for providing a cloud storage service in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, a cloud storage system may distributedly store an object in a plurality of data centers in consideration of storage capacities of the data centers. For example, an object may be divided into a plurality of sub-objects based on a fragmentation size and the plurality of sub-objects may be distributedly stored into a plurality of data centers according to a storage capacity of each data center. Hereinafter, an apparatus and method for distributedly storing an object in a cloud storage system in accordance with an embodiment of the present invention will be described with reference to the accompanying drawings.

FIG. 1 shows a cloud storage system for providing a cloud storage service in accordance with an embodiment of the present invention.

Referring to FIG. 1, cloud storage system 100 may provide various types of cloud storage services to clients 101, 102, and 103 through a network. For example, clients 101, 102, and 103 may access elements of cloud storage system 100 through a web service application programming interface (API) or through a web-based user interface and provided requests for cloud storage system 100 to store or retrieve data. In addition to data storing and retrieving, cloud storage service may include data sharing, data back-up, and common data processing.

Cloud storage system 100 may include cloud storage server 200 and a plurality of data centers, show as data centers 110, 120, and 130. Cloud storage server 200 may control and manage one or more of data centers 110, 120, and 130. For example, cloud storage server 200 may virtually integrate data centers 110, 120, and 130 and control data centers 110, 120, and 130 as one virtual storage unit. When expansion of an overall storage capacity of cloud storage system 100 is desired, cloud storage system 100 may virtually add a new data center or add a new storage device into an existing data center. Furthermore, cloud storage system 100 may replace an existing data center having a small storage capacity with another, new data center having a large storage capacity.

Data centers 110, 120, and 130 may be scattered over numerous and distinctly separated geographic regions. Each data center 110, 120, or 130 may include at least one corresponding storage device. For example, each of data centers 110, 120, or 130 may include a corresponding plurality of storage devices, each storage device having different storage capacity. Data centers 110, 120, and 130 may perform an operation such as storing and/or retrieving data in response to control of cloud storage server 200, but the present invention is not limited thereto. Data centers 110, 120, and 130 may perform the operation in response to a request directly received from clients 101, 102, and 103. Such data centers 110, 120, and 130 may receive data from clients and store the received data in storage devices selected by cloud storage server 200. Furthermore, data centers 110, 120, and 130 may retrieve data from at least one storage devices in response to the control of the cloud storage server 200 and transmit the retrieved data to clients through cloud storage server 200.

Clients 101, 102, and 103 may access cloud storage system 100 through a network and be provided with a cloud storage service. Due to advantages of various networks, clients 101, 102, and 103 are not necessarily limited in their geographic locations for accessing cloud storage system 100 or receiving the cloud storage service from cloud storage system 100. Particularly, clients 101, 102, and 103 may be connected to cloud storage system 100 through at least one network and access data centers 110, 120, and 130 through cloud storage server 200. Client 101, 102, or 103 may use the cloud storage service without knowledge of storage capacities of data centers 110, 120, and 130 and without knowledge of information on synchronization status between data centers 110, 120, and 130.

In general, cloud storage system 200 may be classified into a block based cloud storage system and an object based cloud storage system according to a basic unit of processing data. Hereinafter, a block based cloud storage system and an object based cloud storage system will be described with reference to FIG. 2 and to FIG. 3.

Figure 2:
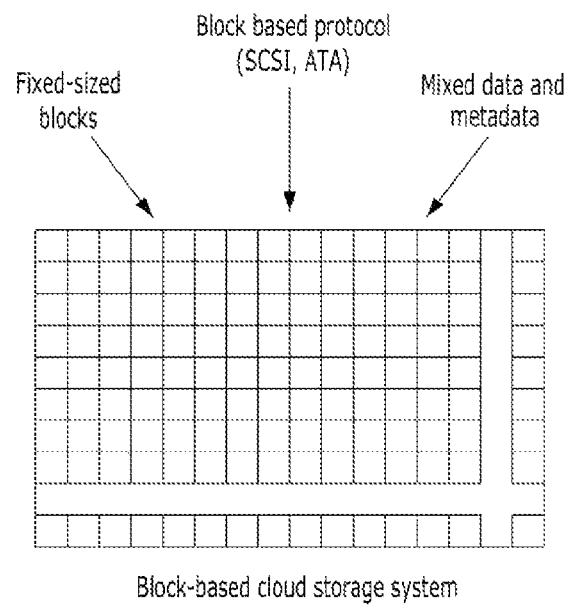
FIG. 2 shows a block based cloud storage system.

FIG. 2 shows an exemplary block based cloud storage system.

Referring to FIG. 2, a block based cloud storage system may be a storage system that processes data in a unit of a block. In the block based cloud storage system, a file system may be divided into fixed-sized blocks and data may be processed in a unit of a block. As shown in FIG. 2, the blocks fixed-sized blocks, blocks of a protocol such as SCSI and ATA, and be mixed data and meta data. For example, the block based cloud storage system may establish an interface between cloud storage server 200 and clients 101, 102, and 103 in a unit of a block. Furthermore, cloud storage server 200 may store and access data in a unit of a block in the block based cloud storage system. The stored and accessed block may have a fixed size and each block may include data and corresponding metadata.

Figure 3:
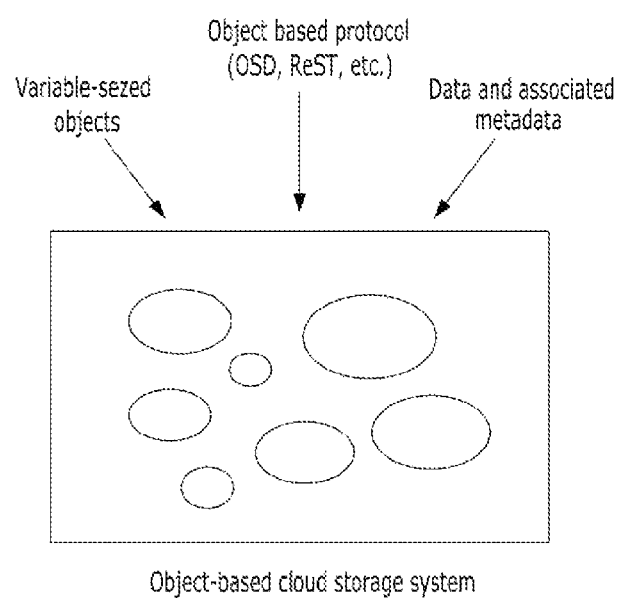
FIG. 3 shows an object based cloud storage system.

FIG. 3 shows an exemplary object based cloud storage system.

Referring to FIG. 3, the object based cloud storage system may be a storage system that processes data in a unit of an object. The object may denote a logical unit of storing data in a storage device. In the object based cloud storage system, data may be split into objects each have a variable size. Such objects may be stored separately from corresponding metadata. The object based protocols, such as OSD and ReST, might typically be supported. In the object based cloud storage system, an interface between cloud storage server 200 and clients may be established in a unit of an object. Cloud storage server 200 may store and access data in a unit of an object in the object based cloud storage system.

As shown in FIG. 3, the object based cloud storage system of FIG. 3 may virtualize storage and store data by a logical object unit. Furthermore, the object based cloud storage system may separately manage metadata from data. The object based cloud storage system may allow clients or cloud storage server 200 to access metadata independently from corresponding object.

Unlike the block based cloud storage system, the object based cloud storage system may logically manage data such as files and directories as well as physically managing storages, for example, allocating data blocks to a disk and mapping data blocks to a disk. The object based cloud storage system may perform the physical storage management in an object based storage device and may apply an object based interface to the physical storage management.

As described above, the object based cloud storage system may manage data and storage devices in a unit of an object. The object based cloud storage system may not restrict a plurality of clients to a physical structure of cloud storage server 200. Accordingly, a processing load of cloud storage server 200 may be reduced. Each client may independently access the same data. The object based cloud storage system may set up a security policy differently per each object. Hereinafter, an apparatus and method for distributedly storing data in data centers according to storage resources of data centers in an object based cloud storage system will be described with reference to FIG. 4.

Figure 4:
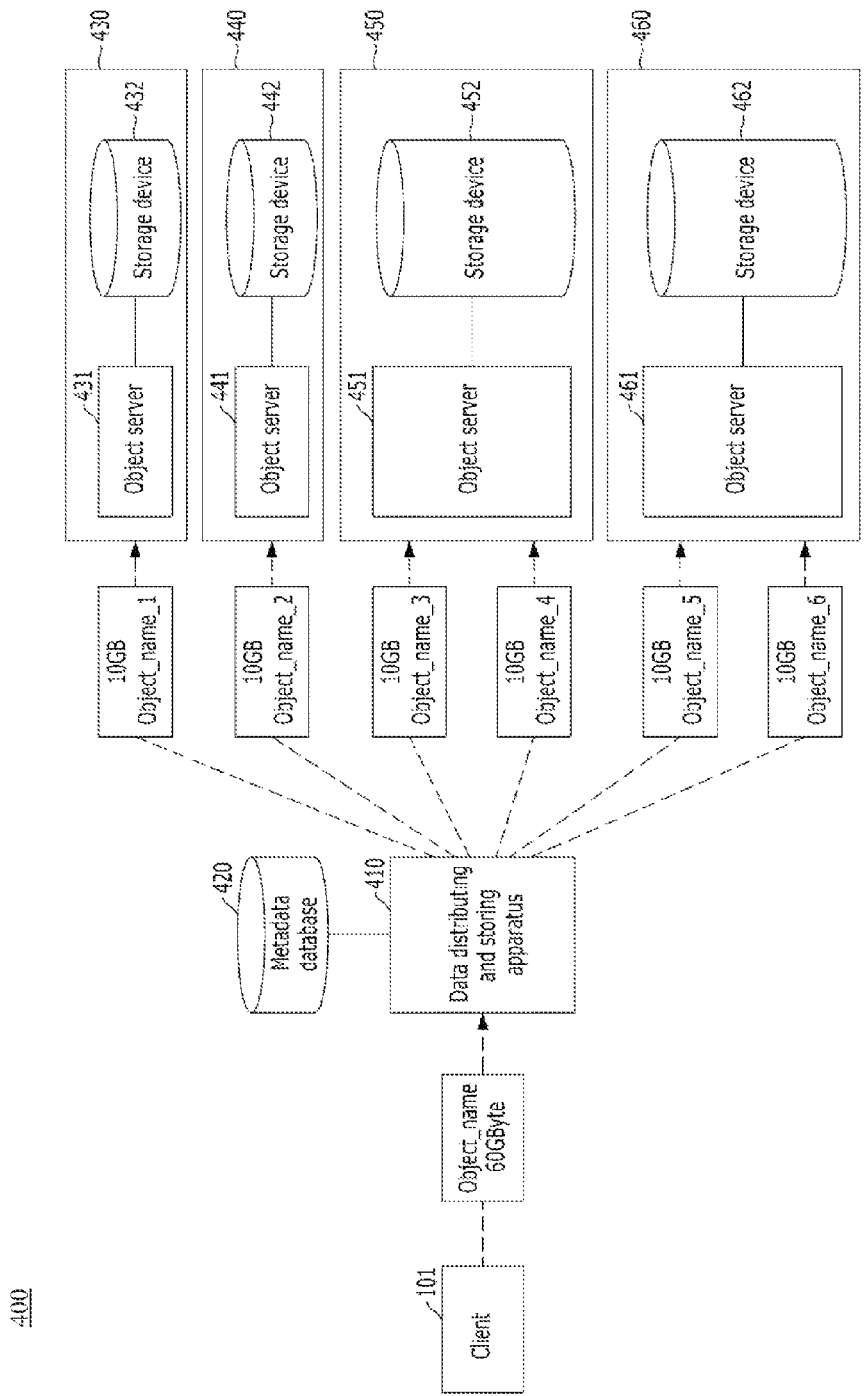
FIG. 4 shows an object based cloud storage system in accordance with an embodiment of the present invention.

FIG. 4 shows an exemplary object based cloud storage system in accordance with an embodiment of the present invention.

Referring to FIG. 4, object based cloud storage system 400 may distributedly store data into data centers 430, 440, 450, and 460 based on a storage resource of each data center in accordance with an embodiment of the present invention. The storage resource may denote a resource of each data center 430, 440, 450, and 460. For example, the storage resource may be a storage capacity of each data center 430, 440, 450, and 460.

Object based cloud storage system 400 in accordance with an embodiment of the present invention may include data distributing and storing apparatus 410 and metadata database 420, coupled to data centers 430, 440, 450, and 460. Data distributing and storing apparatus 410 may perform similar operations of cloud storage server 200 of FIG. 1. Unlike typical cloud storage server 200 of FIG. 1, data distributing and storing apparatus 410 may distributedly store objects to data centers 430, 440, 450, and 460 based on a storage resource, for example, storage capacity, of each data center in accordance with an embodiment of the present invention.

Such data distributing and storing apparatus 410 may also be referred to herein as data distributing and storing server. A structure of data distributing and storing apparatus 410 will be described subsequently in detail with reference to FIG. 7

Data center 430, 440, 450, or 460 may respectively include object servers, 431, 441, 451, or 461, and storage devices 432, 442, 452, and 462. Although data center 430, 440, 450, or 460 are each illustrated in FIG. 4 as including one storage device, the present invention is not limited thereto. For example, each data center 430, 440, 450, and 460 may include a plurality of storage devices. In this case, a storage capacity of a data center may be a sum of storage capacities of corresponding storage devices.

Object servers 431, 441, 451, and 461 may communicate with data distributing and storing apparatus 410. Object servers 431, 441, 451, and 461 may receive data from data distributing and storing apparatus 410 and store the received data in storage devices 432, 442, 452, and 462. Object server 431, 441, 451, and 461 may retrieve particular data stored in storage devices 432, 442, 452, and 462 and transmit the retrieved data to data distributing and storing apparatus 410.

Particularly, cloud storage system 400 may split an object into a plurality of sub-objects and distributedly store the sub-objects into data centers 430, 440, 450, and 460 according to storage capacities of data centers 430, 440, 450, and 460. The storage capacities of data centers 430, 440, 450, and 460 may be storage capacities of storage devices 432, 442, 452, and 462. For example, the object may be particular data such a movie file. Cloud storage system 410 may split the movie file into a plurality of sub-objects and distribute the plurality of sub-objects to data centers 430, 440, 450, and 460 based on the storage capacities of the data centers 430, 440, 450, and 460. Such splitting and distributing will be described in detail subsequently.

In order to distribute a plurality of sub-objects according to a storage capacity of each data center, a weight may be assigned to each data center 430, 440, 450, and 460 in proportion to a storage capacity of a corresponding storage device. For example, data center 410 may include one storage device having a storage capacity of about 20 GB. Data center 420 may include one storage device having a storage capacity of about 20 GB. Data center 430 may include one storage device having a storage capacity of about 40 GB. Data center 440 may include one storage device having a storage capacity of about 40 GB. The storage capacity ratio of data centers may be 20 GB:20 GB:40 GB:40 GB. That is, the storage capacity radio of data centers may be 1:1:2:2. Accordingly, weights of 1, 1, 2, and 2 may be respectively assigned to data centers 410, 420, 430, and 440. In this case, data center 430 may have a weight of 1, data center 440 may have a weight of 1, data center 450 may have a weight of 2, and data center 460 may have a weight of 2. As described above, the weight of each data center 430, 440, 450, and 460 may denote a storage capacity compared to that of others.

The weights of data centers may be used to allocate sub-objects to data centers. Such a weight of each data center may be decided by an operator when an object based cloud storage system is initialized. In accordance with an embodiment of the present invention, data distributing and storing apparatus 410 may determine a storage capacity ratio using storage capacities of storage devices of corresponding data centers and assign weights to data centers according to the storage capacity ratio. An operator or data distributing and storing apparatus 410 may newly add, delete, and modify weights of data centers when a new data center is added to cloud storage system 400, when a data center is released from cloud storage system 400, or when a storage device is added to or deleted from an existing data center.

Data distributing and storing apparatus 410 may allocate sub-objects to data centers according to weights of data centers 430, 440, 450, and 460 and distributedly store sub-objects of a target object to data centers 430, 440, 450, and 460 based on the allocation. Data distributing and storing apparatus 410 may store more sub-objects in a data center having a higher weight than a data center having a lower weight. For example, data distributing and storing apparatus 410 may store one sub-object in data centers 410 and 420 because data centers 410 and 420 have a weight of 1. Data distributing and storing apparatus 410 may store two sub-objects in data centers 430 and 440 because data centers 430 and 440 each have a weight of 2.

Data distributing and storing apparatus 410 may store the weights in metadata database 420 and manage the weights as metadata. Such metadata may include information on mapping relation of a weight to each data center as well as other information such as a first hash value of an object, a correlation value of sub-object, second hash values of sub-objects, a filename of an object, filenames of sub-objects, and mapping relations between sub-objects and data centers. When data distributing and storing apparatus 410 may refer to such metadata to allocate sub-objects to each data center. Such metadata may be stored in metadata database 420 in a form of a data center allocation table. The data center allocation table may be set up by an operator, but the present invention is not limited thereto. Data distributing and storing apparatus 410 may select data centers to store sub-objects and determine the number of sub-objects to be stored to each data center using the data center allocation table. The data center allocation table may be prepared in consideration of locations, distribution status, processing power, and network status as well as weights of data centers. Such a data center allocation table may have a matrix form. Particularly, the data center allocation table may include information on a first hash value of an object, a correlation value of sub-objects, second hash values of sub-objects, a filename of an object, filenames of sub-objects, weights of data centers, and mapping relations between sub-objects and data centers.

Data distributing and storing apparatus 410 may receive a request of storing an object, for example target data, from clients. In response to the storing request, data distributing and storing apparatus 410 may divide the object into sub-objects, and distributedly store the sub-objects in data centers according to storage capacities of data centers.

Data distributing and storing apparatus 410 may receive a request of retrieving an object from a client. In response to the retrieving request, data distributing and storing apparatus 410 may collect sub-Objects distributedly stored in a plurality of data centers, restore the original object by combining the collected sub-objects, and transmit the restored object to the client. Data distributing and storing apparatus 410 may manage necessary information for distributing and storing objects in a form of metadata or a table such as a data center allocation table. For example, the necessary information for distributing and storing data may include a fragmentation size, weights of data centers, a first hash value of an object, correlation values of sub-objects, and second hash values of sub-objects. Data distributing and storing apparatus 410 may store such information in metadata database 430.

When data distributing and storing apparatus 410 receives a storing request from a client with an object, data distributing and storing apparatus 410 may divide the received object into a plurality of sub-objects as follows. Data distributing and storing apparatus 410 may divide an object into a plurality of sub-objects by a fragmentation size (K). The fragmentation size (K) may be determined by dividing an average size of an object by the sum of weights of data centers. The fragmentation size (K) may be determined as the division result or may be a value close to the division result within a certain range. The average size of objects may denote an average size of objects stored in cloud storage system 400. The average size of objects may be determined by an operator or data distributing and storing apparatus 410. The determined average size may be stored and managed by data distributing and storing apparatus 400. An operator or data distributing and storing apparatus 410 may periodically and regularly calculate the average size of objects and update the result.

As described above, the object may be divided into a plurality of sub-objects each having the fragmentation size. Accordingly, an object may be uniformly and efficiently distributed to data centers 430, 440, 450, and 460 in cloud storage system 400.

After dividing the object into the plurality of sub-objects, the plurality of sub-objects may be distributedly stored in data centers 430, 440, 450, and 460 as follows. For example, when data distributing and storing apparatus 410 receives a storing request with a 60 GB-object, data distributing and storing apparatus 410 may divide the object into a plurality of sub-Objects each having a fragmentation size of 10 GB. That is, the received 60 GB-size object may be divided into six 10 GB-size sub-objects.

After dividing, data distributing and storing apparatus 410 may assign a correlation value to each sub-object. The correlation value may denote interrelationship between an object and sub-objects. For example, data distributing and storing apparatus 410 may calculate a first hash value of the object and assign the first hash value to corresponding sub-objects as the correlation value. That is, the correlation value may be identical to the first hash value. Such correlation value and first hash value may be stored in metadata database 430 and managed as metadata or a table. The first hash value may be transmitted with sub-objects to object servers 431, 441, 451, and 461. As described above, an object and corresponding sub-objects may have the same first hash value. Accordingly, when the sub-objects have the same first hash value, a device can determine that those sub-objects may be related to each other. Furthermore, when sub-objects and an object have the same first hash value, a device can determine that the sub-objects and the object are related to each other and the sub-objects are divided pieces derived from the related object.

After assigning the correlation value, data distributing and storing apparatus 410 may automatically create a file name for each sub-object. The file names of sub-objects may be automatically created to consistently maintain interrelationship between the object and the sub-objects.

For example, data distributing and storing apparatus 410 may create a file name of each sub-object to include a certain part of a file name of an object. When a file name of an object is "object_name", data distributing and storing apparatus 410 may create file names of sub-objects to include "object_name." That is, data distributing and storing apparatus 410 may create file names of sub-objects, such as object_name_1, object_name_2, object_name_3, . . . , object_name_N.

Due to such naming scheme, data distributing and storing apparatus 410 may easily or conveniently collect sub-objects related to a target object to retrieve. For example, when a client requests . . . retrieval of a movie file having a file name of "matrix," data distributing and storing apparatus 410 may easily collect sub-objects distributed to a plurality of data centers based on file names of the sub-objects. That is, sub-objects having a part of the file name such as "master" may be collected from the plurality of data centers. For example, sub-objects having filenames of master_1, master_2, master_3, and master_4 may be collected from data centers. The present invention, however, is not limited thereto. The correlation value may be used to collect sub-objects related to a target object instead of the file names of the sub-objects.

Data distributing and storing apparatus 410 may determine whether a sub-object is related to a particular object based on a file name of a sub-object. Sub-objects having similar file names may be stored in a same virtual storage device. Such information on a virtual storage device may be provided to a client as a form of a directory.

After creating the file names of the sub-objects, data distributing and storing apparatus 410 may generate a second hash value based on a file name of a sub-object. The second hash value may be stored in metadata database 430 and may be managed as metadata. The second hash value may be transmitted to a corresponding object server with a sub-object. The second hash values of the sub-objects may be used to select data centers to be stored corresponding sub-objects. The second hash values of the sub-objects are different from each other because the names of the sub-objects are different from each other. Since the second hash value of each sub-object is unique, the second hash values may be processed using a certain scheme and data centers may be selected based on the processing result. For example, the second hash values may be processed to obtain a reference number that indicates at least one data center included in metadata. For another example, when a data center allocation table in a matrix form is prepared and stored in metadata database 420, the second hash values may be processed to generate a matrix coordinate value, for example, (x, y). After obtaining the matrix coordinate value based on the second hash value, data centers indicated by the matrix coordinate value may be selected as data centers to store the sub-objects. The present invention, however, is not limited thereto.

In response to a retrieving request from the client, data distributing and storing apparatus 410 may collect sub-objects distributedly stored in a plurality of data centers 430, 440, 450, and 460 and restore an original object by combining the collected sub-objects. Upon the receipt of the retrieving request, data distributing and storing apparatus 410 may determine data centers storing related sub-objects. In order to determine the data centers, data distributing and storing apparatus 410 may obtain information on data centers storing sub-objects associated with a requested object. Such information may be obtained based on metadata or a data center allocation table associated with the requested object. That is, data distributing and storing apparatus 410 may compare a first hash value of the requested object and correlation values of sub-objects to obtained information on the data centers of corresponding sub-objects. The sub-object location information may be information on data centers storing corresponding sub-objects associated with the requested object.

Data distributing and storing apparatus 410 may request the determined data centers to transmit corresponding sub-objects. Data distributing and storing apparatus 410 may receive sub-objects and restore the requested object by combining the received sub-objects. After restoring the requested object, data distributing and storing apparatus 410 may transmit the restored object to a client.

As described above, cloud storage system 400 may distributedly store sub-objects into a plurality of data centers according to storage capacities of the data centers. Hereinafter, a method for distributedly storing data in accordance with an embodiment of the present invention will be described, in detail, with reference to FIG. 4 and FIG. 5.

Figure 5:
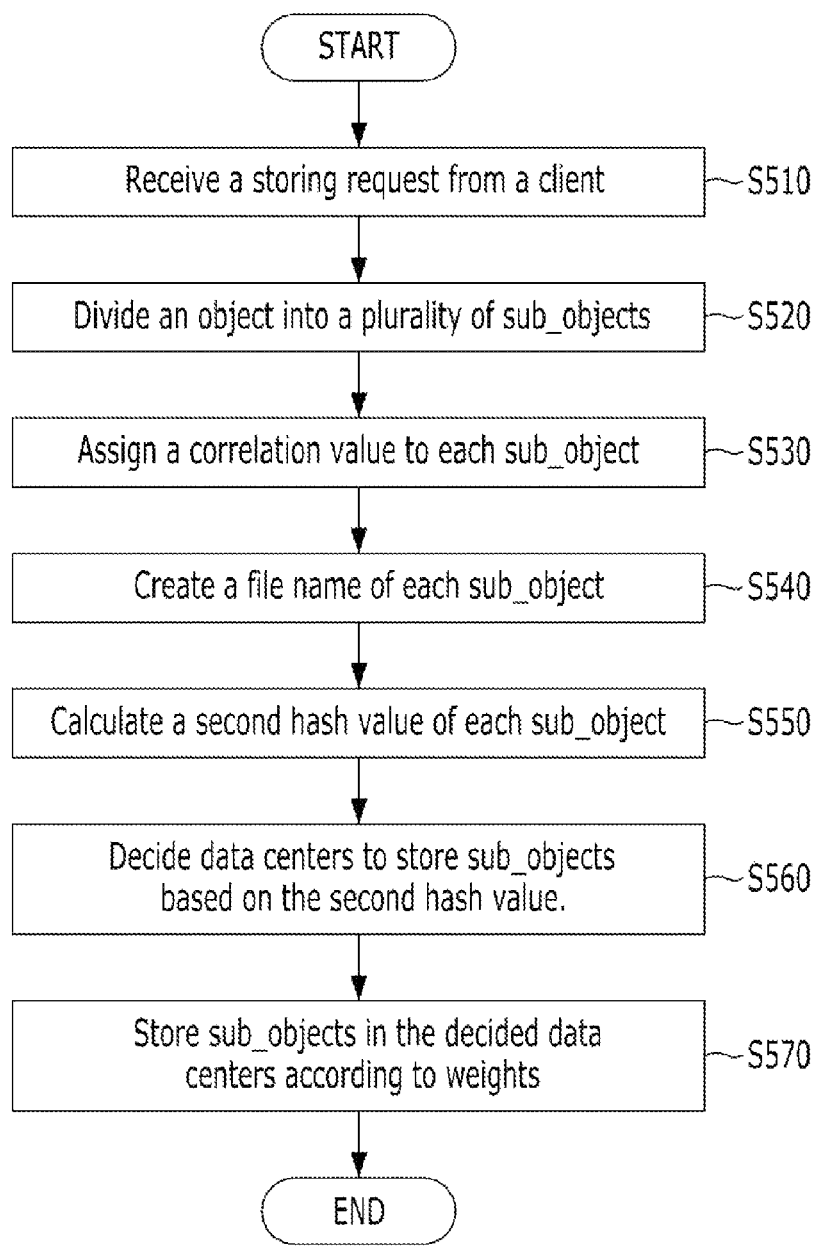
FIG. 5 shows a method for distributedly storing data in response to a storing request from a client in accordance with an embodiment of the present invention.

FIG. 5 shows a method for distributedly storing data in a cloud storage system in response to a storing request from a client in accordance with an embodiment of the present invention.

Referring to FIG. 5, a request of storing a target object may be received from a client with a target object at step S510. For example, clients may transmit a storing request to data distributing and storing apparatus 410, but the present invention is not limited thereto. Clients may transmit the storing request to directly a data center and the data center may transmit the request to data distributing and storing apparatus 410.

The target object may be divided into a plurality of sub-Objects at step S520. For example, data distributing and storing apparatus 410 may divide the target object into N sub-objects by a fragmentation size. As described above, the fragmentation size may be determined by dividing an average size of an object by a sum of weights of data centers. The fragmentation size may be previously determined by an operator or may be dynamically determined by data distributing and storing apparatus 410. The present invention, however, is not limited thereto. Since the method for dividing the target object was already described with reference to FIG. 4, the detailed description thereof will be omitted herein.

At step S530, a correlation value may be assigned to each sub-object. For example, a first hash value of the target object may be calculated and the first hash value may be assigned to each sub-object as the correlation value. The correlation value may denote interrelationship between the requested object and sub-objects. The correlation value and the first hash value may be stored in metadata database 420 as a form of metadata or a form of a table.

At step S540, file names of sub-objects may be created. For example, data distributing and storing apparatus 410 may create file names of sub-objects to have consistency. For example, the file names of sub-objects may include a part of a file name of the target object. When the target object has a name of "object_meeting", sub-objects may be named with "object_meeting_1," "object_meeting_2," . . . , "object-_meeting _N." Due to such naming scheme, data distributing and storing apparatus 410 may easily or conveniently determine whether sub-objects are related to each other or whether sub-objects are related to the target object.

At step S550, a second hash value may be calculated for each sub-object. For example, data distributing and storing apparatus 410 may calculate the second hash value of each sub-object based on a corresponding file name. Since file names of sub-objects are different from each other, each sub-object has a different hash value. The second hash value may be calculated using a file name of each sub-object. Accordingly, the second hash value of each sub-object is unique and different from others.

At step S560, data centers to store sub-objects may be decided based on the second hash value. For example, data distributing and storing apparatus 410 may use the second hash values of sub-objects to decide data centers to store the sub-objects. The second hash values may be processed to obtain a reference number that indicates at least one data center included in metadata. When a data center allocation table in a matrix form is prepared and stored in metadata database 420, the second hash values may be processed to genera a matrix coordinate value, for example, (x, y). After obtaining the matrix coordinate value based on the second hash value, data centers indicated by the matrix coordinate value may be selected as data centers to store the sub-objects. As described above, the data center allocation table may include information on a first hash value of an object, a correlation value of sub-objects, second hash values of sub-objects, a filename of an object, filenames of sub-objects, weights of data centers, and mapping relations between sub-objects and data centers. The present invention, however, is not limited thereto. Such format metadata or data center allocation table may be modified in other embodiments of the present invention.

At step S570, sub-objects may be transmitted to and stored in the selected data centers according to weights of the selected data centers. For example, data distributing and storing apparatus 410 may allocate sub-objects to the selected data centers according to weights of the data centers. As described above, a weight is assigned to each data center according to a storage capacity of each data center. A higher weight may be assigned to a data center having a larger storage capacity than a data center having a lower storage capacity. Accordingly, more sub-objects may be stored in a data center having a higher weight than a data center having a lower weight. The weights of the data centers may be stored in metadata database 420 in a form of metadata or a form of a data center allocation table. Data distributing and storing apparatus 410 may refer to the metadata or the data center allocation table to allocate sub-objects to the data centers. After allocating, sub-objects are transmitted to and stored in the allocated data centers according to the weights of the allocated data centers.

Figure 6:
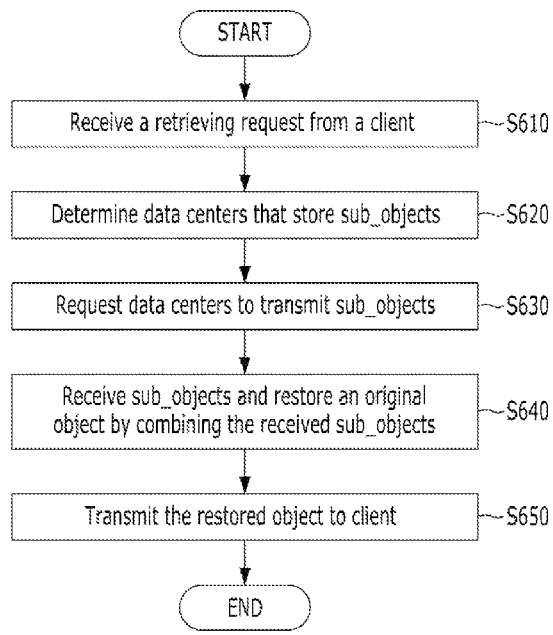
FIG. 6 shows a method for retrieving an object in response to a retrieving request from a client in accordance with an embodiment of the present invention.

FIG. 6 illustrates a method for retrieving an object in response to a retrieving request from a client in accordance with an embodiment of the present invention.

Referring to FIG. 6, at step S610, a request for retrieving a target object may be received from a client. Such a retrieving request may be transmitted from a client to data distributing and storing apparatus 410. At step S620, locations of sub-Objects may be determined. For example, data distributing and storing apparatus 410 may obtain information on data centers storing sub-objects of the requested object using associated metadata. Data distributing and storing apparatus 410 may refer to metadata or a data center allocation table stored in metadata database 420 to determine the data centers storing sub-objects. For example, data distributing and storing apparatus 410 may calculate a hash value of the requested object and compare the calculated hash value with correlation values of the sub-objects, which are included in associated metadata. The sub-objects having the correlation value identical to the first hash value of the requested object are sub-objects divided from the requested object. Metadata of the sub-object having the correlation value identical to the hash value of the requested object may include information on a data center or a storage device of a data center, which store the sub-object. Such information may be an identifier of a data center. Accordingly, the locations of sub-objects may be determined.

At step S630, the determined data centers may be requested to transmit corresponding sub-objects. For example, data distributing and storing apparatus 410 may request the determined data centers to transmit the corresponding sub-objects.

At step S640, sub-objects may be received from the determined data centers, the received sub-objects may be combined, and an original object may be restored. For example, data distributing and storing apparatus 410 may receive sub-objects from the data centers, combine the received sub-objects, and store the combining result with a file name identical to the file name of the requested object.

At step S650, the restored object may be transmitted to the client. For example, data distributing and storing apparatus 410 may transmit the restored object to the client.

Figure 7:
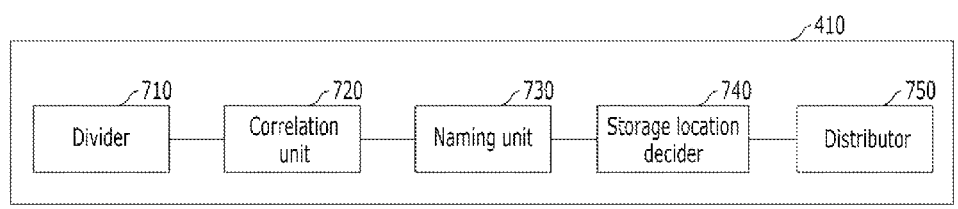
FIG. 7 shows a data distributing and storing apparatus in a cloud storage system in accordance with an embodiment of the present invention.

FIG. 7 shows a data distributing and storing apparatus in a cloud storage system in accordance with an embodiment of the present invention.

Referring to FIG. 7, data distributing and storing apparatus 410 may include divider 710, correlation unit 720, naming unit 730, storage location decider 740, and distributor 750.

Divider 710 may uniformly divide an object into a plurality of sub-objects based on a fragmentation size (K). The fragmentation size (K) may be decided as a result of dividing an average size of an object by a sum of weights or decided as a value close to the division result.

Correlation unit 720 may calculate a first hash value of an object and assign the first hash value to sub-objects as a correlation value. The first hash value may be a hash value of the requested object. That is, correlation unit 720 may define interrelationship between an object and related sub-objects by assigning the correlation value to sub-objects. Based on the correlation value, sub-object having the same correlation value may be stored in the same virtual storage space. Such operation may be performed by a memory (not shown).

Naming unit 730 may create file names of sub-objects to maintain interrelationship to an object. For example, naming unit 730 may create file names of sub-objects to include a part of a file name of an object. That is, file names of sub-objects may include the same part of the file name of the object. When the file names of sub-objects have an identical part, data distributing and storing apparatus may determine that the sub-objects are related to each other or that the sub-objects are related to the same object. Since naming a file name of a sub-object was already described with reference FIG. 4, the detailed description thereof will be omitted herein.

Storage location decider 740 may calculate a second hash value of each sub-object based on a file name of sub-object. Since the file names of sub-objects are different from each other, the second hash values of sub-objects are different from each other. Data centers to store sub-objects may be selected based on the second hash value of sub-objects. For example, storage location decider 740 may process the second hash values to obtain a reference number that indicates at least one data center included in metadata. Accordingly, storage location decider 740 may select data centers to store sub-objects by referring to metadata using the obtained reference number. For another example, when a data center allocation table in a matrix form is prepared and stored in metadata database 420, storage location decider 740 may generate a matrix coordinate value, for example, (x, y) by processing the second hash values. After obtaining the matrix coordinate value based on the second hash value, storage location decider 740 may select data centers indicated by the matrix coordinate value from the data center allocation table stored in metadata database 420. Storage location decider 740 may determine the selected data centers as data centers to store the sub-objects. As described above, the data center allocation table may include information on a first hash value of an object, a correlation value of sub-objects, second hash values of sub-objects, a filename of an object, filenames of sub-objects, weights of data centers, and mapping relations between sub-objects and data centers. The present invention, however, is not limited thereto. Such format of metadata or data center allocation table may be modified in another embodiment of the present invention.

Distributor 750 may distribute the sub-objects to the selected data centers according to weights of the decided data centers. For example, distributor 750 may allocate sub-objects to the selected data centers according to weights of the data centers. As described above, a weight is assigned to each data center according to a storage capacity of each data center. A higher weight may be assigned to a data center having a larger storage capacity than a data center having a lower storage capacity. Accordingly, more sub-objects may be stored in a data center having a higher weight than a data center having a lower weight. The weights of the data centers may be stored in metadata database 420 in a form of metadata or a form of a data center allocation table. Distributor 750 may refer to the metadata or the data center allocation table to allocate sub-objects to the data centers. After allocating, distributor 750 may transmit sub-objects to and store the sub-objects in the allocated data centers according to the weights of the allocated data centers.

Reference herein to "one embodiment" or "an embodiment" means that particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for distributedly storing data in a plurality of data centers in a cloud storage system, the method comprising:
    receiving a storing request from a client;
    dividing an object associated with the storing request into a plurality of sub-objects each having a fragmentation size, wherein the fragmentation size is determined by dividing an average object size by a sum of weights of the data centers, the average object size corresponding to an average size of objects stored in the cloud storage system and periodically calculated and updated;
    assigning a correlation value to each one of the plurality of sub-objects;
    creating a file name of each one of the plurality of sub-objects;
    calculating a first hash value, as the correlation value, of each one of the plurality of sub-objects;
    calculating a second hash value, as a representative value, of each one of the plurality of sub-objects;
    deciding data centers among the plurality of data centers to store the plurality of sub-objects based on the representative value of each one of the plurality of sub-objects, wherein the decided data centers are selected from the plurality of data centers based on the second hash value of each one of the plurality of sub-objects;
    determining a number of sub-objects to be stored in each one of the decided data centers based on a weight of each data center; and
    distributedly storing the plurality of sub-objects in the decided data centers based on the determined number of sub-objects, wherein for the distributedly storing a corresponding weight of a data center is based on a ratio of a storage capacity of the data center to storage capacities of other data centers.

2. The method of claim 1, comprising determining the weight based on storage resources of each of the plurality of data centers.

3. The method of claim 2, wherein the storage resources include storage capacities of the plurality of data centers.

4. The method of claim 1, wherein for the distributedly storing the sub-objects, more sub-objects are stored in the data center having a higher weight than the data center having a lower weight.

5. The method of claim 1, comprising storing and managing the weights of the data center in a form of metadata.

6. The method of claim 1, comprising receiving the object from the client with the storing request in the cloud storage system.

7. The method of claim 1, further comprising:
    calculating the first hash value of the object; and
    assigning the first hash value to the sub-objects as the correlation value.

8. The method of claim 7, comprising storing and managing the first hash value of the object and the correlation value of the sub-objects as metadata.

9. The method of claim 7, comprising determining, with the first hash value of the object and the correlation value of the sub-objects, whether the object is related to the sub-objects and whether the sub-objects are related to each other.

10. The method of claim 1, wherein the deciding data centers among the plurality of data centers includes: calculating the second hash value, as the representative value, of each sub-object based on the filename of each sub-objects; and determining at least one data center to store sub-objects based on the second hash value of a corresponding sub-object.

11. The method of claim 10, comprising: processing the second hash value of each sub-object into a reference number and indicating, based on the second hash value, at least one data center in metadata stored in a metadata database.

12. An apparatus for distributedly storing an object in a plurality of data centers included in a cloud storage system, the apparatus comprising:
    a memory;
    a divider configured to receive a storing request from a client and divide an object associated with the storing request into a plurality of sub-objects each having a fragmentation size, wherein, the fragmentation size is determined based on a result of dividing an average object size by a sum of the weights of the data centers, the average object size corresponding to an average size of objects stored in the cloud storage system and periodically calculated and updated;
    a storage location decider configured to decide data centers among the plurality of data centers to store the plurality of sub-objects based on a representative value of each one of the plurality of sub-objects, wherein the storage location decider is configured to assign a correlation value to each one of the plurality of sub-objects, to create a file name of each one of the plurality of sub-objects, to calculate a first hash value, as the correlation value, of each one of the plurality of sub-objects, and to calculate a second hash value, as the representative value, of each one of the plurality of sub-objects, wherein the decided data centers are selected from the plurality of data centers based on the second hash value of each one of the plurality of sub-objects;

a distributor configured to determining a number of sub-objects to be stored in each one of the decided data centers based on a weight of each data center and distributedly store the plurality of sub-objects in the decided data centers based on the determined number of sub-objects; and a weight of a data center is a ratio of a storage capacity of the data center to storage capacities of other data centers.

13. The apparatus of claim 12, further comprising:

a correlation unit configured to calculate the first hash value of the object and assign the first hash value to the sub-objects as the correlation value;

a naming unit configured to create a file name of each one of the plurality of sub-objects; and the storage location decider configured to calculate the second hash value, as the representative value, of each sub-object based on the filename of each sub-object and to determine at least one data center to store the sub-objects based on the second hash value of each sub-object.

14. The apparatus of claim 13, wherein:

the storage location decider is configured to i) obtain reference numbers that indicate the at least one data center in metadata stored in a metadata database by processing the second hash value of each sub-object and ii) determine data centers to store the sub-objects based on the reference numbers; and the distributor is configured to store more sub-objects in the data center having a higher weight than the data center having a lower weight.

* * * * *